US010009468B1

(12) United States Patent
Svensson (10) Patent No.: US 10,009,468 B1
(45) Date of Patent: Jun. 26, 2018

(54) METHOD, COMPUTER PROGRAM PRODUCT AND COMPUTER SYSTEM FOR A CHAT BASED COMMUNICATION SYSTEM (71) Applicant: Teleopti AB, Stockholm (SE)

(72) Inventor: Göran Svensson, Stockholm (SE)

(73) Assignee: TELEOPTI AB, Stockholm (SE)

( * ) Notice: Subject to any disclaimer, the term of this patent is extended or adjusted under 35 U.S.C. 154(b) by 0 days. days.

(21) Appl. No.: 15/439,194

(22) Filed: Feb. 22, 2017

(30) Foreign Application Priority Data

Feb. 23, 2016 (SE) ...................... 1650229

(51) Int. Cl.
H04M 3/00 (2006.01)
H04M 5/00 (2006.01)
H04M 3/523 (2006.01)
H04M 3/51 (2006.01)

(52) U.S. Cl.
CPC ....... *H04M 3/5238* (2013.01); *H04M 3/5191* (2013.01); *H04M 2203/402* (2013.01)

(58) Field of Classification Search
CPC .............................. H04M 2203/402
USPC .................................... 379/265.09
See application file for complete search history.

(56) References Cited

U.S. PATENT DOCUMENTS 7,761,321 B2 * 7/2010 Kannan ............ G06Q 10/06311
705/7.13
8,064,589 B2 * 11/2011 Lewis .................. H04M 3/5175
379/265.02
8,332,249 B1 * 12/2012 Aykin .................... G06Q 10/06
705/7.11
8,612,272 B1 * 12/2013 Aykin .................. G06Q 10/063
705/7.11
9,787,840 B1 * 10/2017 Neuer, III ........... H04M 3/5232
2002/0047859 A1 * 4/2002 Szlam ............... G06F 17/30899
715/705
2006/0239440 A1 * 10/2006 Shaffer ................. H04M 3/523
379/265.02
2007/0198359 A1 * 8/2007 Kannan ............ G06Q 10/06311
705/26.41
2008/0147470 A1 * 6/2008 Johri ...................... G06Q 10/06
379/265.11
2009/0316873 A1 * 12/2009 Lewis .................. H04M 3/5175
379/202.01
2016/0088153 A1 * 3/2016 Wicaksono ......... H04M 3/5175
379/265.06

* cited by examiner

*Primary Examiner* — Khai N Nguyen
(74) *Attorney, Agent, or Firm* — Buchanan Ingersoll & Rooney PC (57) ABSTRACT

A method of estimating a number of agents needed in a queueing system where each active agent is available to work on several tasks in parallel, includes the steps of obtaining a representation of the queueing system comprising information on all possible states that the queueing system can be in and the intensity rates for the possible transitions between states calculating the resulting service level for the tentative number of active agents based on the state probability vector, which is based on the representation, a service rate values $\mu_{i,j}$ and an arrival rate intensity value $\lambda$ and comparing the resulting service level to the target service level.

15 Claims, 6 Drawing Sheets

|  | 0,0 | 0,1 | 0,2 | 1,0 | 1,1 | 1,2 | 2,0 | 2,1 | 2,2 |
|---|---|---|---|---|---|---|---|---|---|
| 0,0 | $d_0 = -\lambda$ | $\lambda/2$ | 0 | $\lambda/2$ | 0 | 0 | 0 | 0 | 0 |
| 0,1 | $\mu_1$ | $d_1 = -\mu-\lambda$ | 0 | 0 | $\lambda$ | 0 | 0 | 0 | 0 |
| 0,2 | 0 | $2\mu_2$ | $d_2$ | 0 | 0 | $\lambda$ | 0 | 0 | 0 |
| 1,0 | $\mu_1$ | 0 | 0 | $d_3$ | $\lambda$ | 0 | 0 | 0 | 0 |
| 1,1 | 0 | $\mu_1$ | 0 | $\mu_1$ | $d_4$ | $\lambda/2$ | 0 | $\lambda/2$ | 0 |
| 1,2 | 0 | 0 | $\mu_1$ | 0 | $2\mu_2$ | $d_5$ | 0 | 0 | $\lambda$ |
| 2,0 | 0 | 0 | 0 | $2\mu_2$ | 0 | 0 | $d_6$ | $\lambda$ | 0 |
| 2,1 | 0 | 0 | 0 | 0 | $2\mu_2$ | 0 | $\mu_1$ | $d_7$ | $\lambda/2$ |
| 2,2 | 0 | 0 | 0 | 0 | 0 | $2\mu_2$ | 0 | $2\mu_2$ | $d_8$ |

METHOD, COMPUTER PROGRAM PRODUCT AND COMPUTER SYSTEM FOR A CHAT BASED COMMUNICATION SYSTEM

TECHNICAL FIELD

The present invention relates to a method, a computer program product and a computer system for estimating a number of agents needed for ensuring a target service level in a queueing system in which a number of agents perform tasks and each agent can work on several tasks in parallel. Also, a method for determining the optimal maximum number of simultaneous tasks is presented.

BACKGROUND AND RELATED ART

In particular, but not exclusively, the invention relates to such a method, computer program product and computer system for a chat based communication system, typically through the Internet. Customer service systems are often based on chat functions. The customer will start an internet based chat with an agent and receive help from this agent through the chat. This enables customer service in near real time in a more flexible way than telephone support. For maximum efficiency each agent is normally set up to handle a certain number of chats concurrently. Since the number of ongoing queries will vary over time there is a desire to determine how many agents will be needed at any given time to provide a target service level.

The target service level may be specified in terms of any suitable measure but will typically be based on the average waiting time before an incoming task is handled by an agent, or the probability of receiving service within a certain time. Instead of the waiting time, the total time from when a task arrives until it is completed may be considered as a more relevant measure for the system owner to measure flow through the queueing system.

U.S. Pat. No. 8,064,589 discloses a method of estimating the number of agents needed to serve a plurality of chat channels. This solution is based on the assumption that the system is saturated, that is, that all agents are always fully occupied.

In a real situation of course the work load in the system may vary with time and there may be periods of time in which the system is not saturated.

SUMMARY

It is therefore an object of the invention to provide a method and a computer system for estimating the number of agents needed in a queueing system as defined above, without the above restriction.

The invention relates to a method of estimating the number of active agents needed at a given time, for achieving a target service level for a queueing system involving a number of potential active agents, each active agent being available to work on several tasks in parallel. The method is performed in a computer and comprises the following steps:
  obtaining a representation of the queueing system involving a tentative number of active agents and a tentative maximum number of concurrent tasks handled by each agent, said representation comprising
    information on all possible states that the queueing system can be in, each state being defined by the number of tasks handled by each of the active agents, or groups of agents, and number of customers in the queueing system
    all possible transitions between the possible states,
    the intensity rate for each of the possible transitions,
  calculating a distribution of a state probability vector based on the representation, service rate values $\mu_{i,j}$ and an arrival rate intensity value $\lambda$
  calculating the resulting service level for the tentative number of active agents based on the state probability vector.
  Evaluating the resulting service level,
  Selecting the number of active agents needed in dependence of the resulting service level.

An active agent is one that is available for serving a client. Each active agent may at any given time be serving one or more clients, or may be idle.

Preferably, the evaluating step comprises comparing the resulting service level to the target service level and selecting the number of active agents needed in dependence of the outcome of the comparison.

The result of the comparison may be used to select the number of active agents needed in dependence of the outcome of the comparison. Typically, to find the optimum number of active agents, the method will be repeated for a second tentative number of active agents and/or a second tentative number of concurrent tasks. The lowest number of active agents fulfilling the service level criteria should be selected to reconcile service requirements with economic efficiency. However, it would also be possible to base the selection on one result only, for example, by determining if the result meets a specified service level.

Hence, the invention is based on a complete state-space model for task queues and the determination of the probability of the system being in each such state. The inventive method will provide a way of calculating the number of agents needed for a specific service level, for an arbitrary workload in the system. This means that the method according to the invention will work for a saturated system but will also work even if the system is not saturated at all times.

The invention also relates to computer program product comprising computer readable code means which when run in a computer will cause the computer to perform the method as defined by the claims. The computer program product is typically stored on a suitable form of data carrier. The computer program product may be a non-transitory computer-readable medium encoded with computer-executable instructions which when run in a processor will cause the processor to perform the method according to any of the embodiments as defined above.

The invention also relates to a computer system comprising a processor arranged to run programs, a program memory comprising a program according to the above, in such a way that it can be executed in the processor to perform the inventive method, and a data memory arranged to hold data to be used by the program.

As will be understood, the method is normally a computer implemented method, either in the same computer system providing the support system or in a different computer system.

The state is typically defined by the number of concurrent tasks currently handled by each of the active agents and the total number of tasks in the system. The method is based on an assumption of equilibrium, or steady-state, that is, that the probability of the system being in each state will be substantially constant over a period of time.

The target service level may be set in any suitable way, for example, as outlined above. One criterion may be the average response time before a chat request is answered. Another criterion may be the average time until a problem has been resolved. Alternatively, a criterion may be based on the response time or total time experienced by a certain percentage of the users, for example that at least a certain percentage of the users should experience a certain maximum response time. Or the target service level and corresponding measure may be set based on experience.

The service rate values and/or the arrival rate intensity value are typically based on estimates for the respective values, which may be set in any suitable way, for example on the basis of experience or calculated according to a suitable algorithm The tasks are assumed to be exchangeable.

The arrival intensity for new tasks to the queueing system may advantageously be assumed to follow a Poisson distribution, which has been found to be a good approximation for the arrival intensity. Also, the service rate is advantageously assumed to follow an exponential distribution or a hypoexponential distribution. Such distributions provide suitable approximations for the service rate. Erlang distribution is a particularly suitable type of gamma distribution for this method.

Obtaining the representation of the queueing system typically involves applying an assignment rule for assigning an incoming task to one of the active agents. The assignment rule may handle the active agents individually or in one or more groups. For example, the groups may be based on the agents' level of experience, specialization or capacity.

A maximum number of concurrent tasks is normally set for each agent, to limit the work load for any particular agent. The maximum number of concurrent tasks may be the same for all agents or may be set individually or for each group, depending on the agent's efficiency or level of experience or other suitable criterion.

The agents may be handled individually, or one or more groups of agents may be defined, and each of the active agents arranged to handle the same tentative maximum number of concurrent tasks, the state being based on the number of agents in the group handling each possible number of concurrent tasks. Each group may have one or more agents in it.

According to one possible allocation rule, an incoming task is allocated to one of the active agents by determining which active agent or agents has/have the lowest number of ongoing tasks and selecting one of these agents. Any rule reflecting the desired distribution of tasks between agents may be used.

The target service level should be selected to provide an acceptable perceived service level for the clients. The target service level may be selected in dependence of at least one of the following, for example as an average or a maximum value for a certain percentage of the tasks:
Waiting time
Session duration
Total time, that is, the waiting time plus the session duration In a relatively small system it will be feasible to solve the whole system, while keeping track of all the individual agents, to obtain the solution. In larger systems the number of computations will increase rapidly with increasing number of agents. In such cases it will be feasible to make some simplifying assumptions. For example the system may be defined under the assumption that all agents have identical properties. This will significantly reduce the number of states that have to be considered. Alternatively the agents may be divided into groups, where all agents in a group are assumed to have identical properties. This will also reduce the number of states although not as much as having only one category.

Notation and Definitions

This section will define some important concepts and parameters:

$m_i$ the number of agents in the group i.

$n_i$ the maximum number of simultaneous tasks per agent+1, where i represents the group (i.e. the number of states for a single agent of that group).

$n'_i$ the maximum number of simultaneous tasks per agent (that is, $n'_i=n_i-1$), where i represents the group.

$a_{i,j}$ the state of a single agent, where i represents the group the agent belongs to and j corresponds to the number of the agent. In this document, when a appears with only one sub-index j, this sub-index indicates the number of the agent and it is assumed that the group is not significant.

$\lambda$ the arrival rate for new tasks or customers. Typically a Poisson distribution is assumed for new arrivals.

$\mu_{ij}$ the service rate per task/customer for an agent, where i represents the group and j the number of customers concurrently being served by that agent.

$j\mu_{ij}$ the total service rate for an agent handling j tasks (for example, serving j customers).

$\bar{\pi}$ the probability distribution vector, state space representation $\pi_{a_{jk}a_{j(k-1)}a_{j(k-2)}\ldots}$ the probability of a particular state where $a_{jk}\ldots$ denotes the state of each agent defined as the number of customers currently being served by the agent, with consideration of category groupings.

$\bar{p}$ the state probability distribution vector, enumeration over states representation.

$p_i$ the probability of being in state i where i takes integer values, representing different states, one for each possible state.

N the maximum number of possible states in the system without a waiting queue.

M The total number of states of the system, may be countably infinite g the number of different groups of indistinguishable agents.

waiting time the time a customer has to wait before receiving a first response service time the time from the first response until the chat is closed assignment rule the rule by which customers are assigned agents to serve them.
If no particular assignment rule is designated it is assumed that all agents who are currently servicing the least number of customers have an equal probability of being designated as the serving agent to the customer, up to their maximum.

BRIEF DESCRIPTION OF THE DRAWINGS

Embodiments of the invention will be described in more detail in the following, with reference to the appended drawings, in which.

DETAILED DESCRIPTION OF PREFERRED EMBODIMENTS

In the following, embodiments of the invention will be described as implemented in a chat-based customer service system in which a number of agents are employed. In this document, the term agent generally means active agent, that is, agents available to engage in sessions. At any given time, each active agent can be idle or be involved in a number of chat sessions, up to a maximum number of simultaneous chat sessions. The state for each individual agent is defined by the number of customers that agent is currently serving.

The chats are assumed to be independent and indistinguishable from one another in terms of service required, as dictated by the corresponding probability distribution. The rate of new arrivals to the queueing system is assumed to follow a Poisson process with arrival rate parameter $\lambda$. The service times are assumed to follow some suitable distribution, like exponential or gamma distribution. In all examples the service times are assumed to be exponentially distributed with the service rate parameter $\mu_{ij}$ per customer. It is also often assumed that the maximum service rate for a particular customer occurs when the serving agent has no other customers at the same time, and that the service rate per customer will be lowered, while an agent's total service rate may increase, if more customers are being served.

Figure 1:
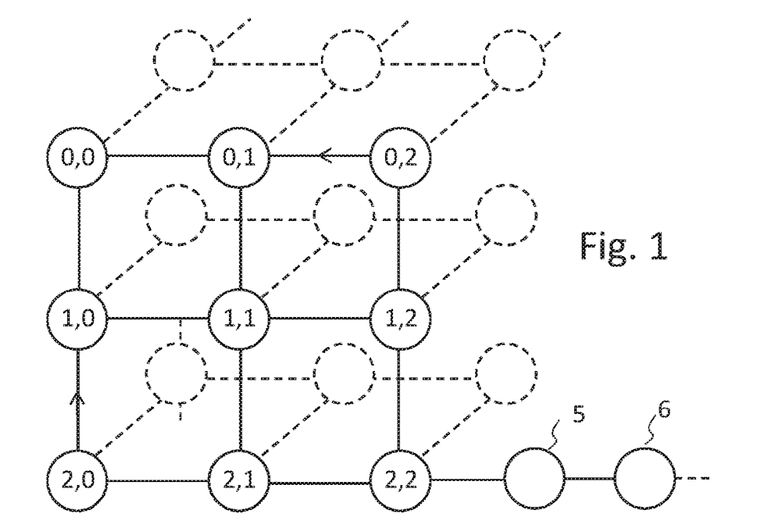
FIG. 1 shows an example of a partial queueing system with two agents who each can serve up to two customers simultaneously.

In classical queueing theory the state of the system represents the total number of customers in the system. For a system as described above the state is described by the total number of customers in the system and their distribution over the available agents, which may be divided into groups. FIG. 1 shows an example of a two agent queueing system with a maximum of two simultaneous clients per agent. This creates a three-by-three state space, represented by the solid lines and nodes, in which each node represents a possible state, characterized by the concurrent number of clients handled by each agent. For example, the node in the uppermost left corner is denoted 0,0 which means that both agents are idle. The node just below this node is denoted 1,0 meaning that the first agent is currently serving one client and the second agent is idle. The node to the right is denoted 0,1, which means that the second agent is serving one client and the first agent is idle. In the example shown in FIG. 1, a transition may be made in both directions between any two states, except for the two transitions marked with arrows, which can only occur in the direction of the arrow.

The node representing the state in which all agents are busy and there is no waiting queue is denoted 2,2, which means that both agents are currently serving their maximum number of clients, that is, the system is saturated. If any clients enter the system when in this latter state, they will be added to the waiting queue and will have to wait for service until one of the agents is ready to serve them. In the example shown in FIG. 1, there are two such waiting states, denoted 5 and 6, arranged to wait in the queue until an agent has a free slot. Hence, the complete state-space also includes all states where there is a queue. When there is no queue and at least one agent is serving fewer than the maximum number, a new customer will typically be routed to an agent having free capacity, typically the agent currently serving the lowest number of customers. It is also possible to apply some other criterion for routing the new customer, an assignment rule, based on which agent is best suited to serve the customer. The waiting queue is assumed to behave like a classical, potentially infinite, Markovian queue, but well known features such as reneging, balking, blocking and similar features may be added as needed.

As the skilled person is aware, different conventions exist for representing such a system. These are equivalent and although one example is shown here, other conventions may be applied in the method according to the invention and will yield an equivalent result.

The person skilled in the art will know how to expand the state space model to include more simultaneous clients per agent by adding more rows and columns. The person skilled in the art will also know how to expand the state-space model to include more agents by expanding the state space, as indicated in FIG. 1 by the dashed lines and nodes. In the simplest case the agents are assumed to have the same properties, but it would also be possible to assign different properties to the agents. For example it may be determined that the first agent is less experienced and can handle up to a maximum of 3 persons whereas the second agent is more experienced and can handle up to 5 clients simultaneously. The effective service rate indicates the average total number of clients that can be served during a specific time period and with a certain work load.

By convention, the service rate is denoted $\mu$, typically with subscripts indicating the group of the agent and the number of clients served. Accordingly, $1/\mu$ is the average time that it takes to finish a chat. As will be understood, when the number of simultaneous clients serviced by one agent increases, $\mu$ will decrease and $1/\mu$ will increase. Normally the change in $1/\mu$ will not be proportional to the change in number of clients. The increase will often be lower, since a chat will normally involve a certain amount of waiting time, which can be used to service other clients without causing a delay, up to a point.

Figure 2:
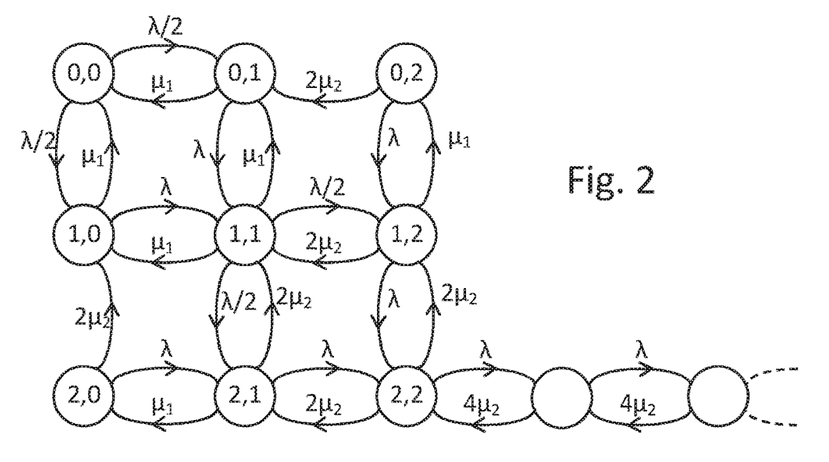
FIG. 2 shows the same queueing system as in FIG. 1, also illustrating the arrival rate and the service rates with the standard assignment rule for two indistinguishable agents.

FIG. 2 shows the same system model as FIG. 1, but with indicators of the rate of moving between any two adjacent states, expressed in terms of $\mu_{ij}$ and) $\lambda$, respectively. For example, if the system is in the uppermost left state, 0,0 where both agents are idle, no service is performed and hence only arrivals are possible. When an arrival occurs it will be immediately served by one of the agents. The probability of the state changing to one of the adjacent states, in which one agent is handling one task, is related to the arrival rate $\lambda$. Since in this example the standard assignment rule is assumed and incoming tasks may be directed to either agent with the same probability. Hence the intensity of moving to the state 0,1 (arriving chat is allocated to the first agent) and the intensity of moving to the state 1,0 (arriving chat is allocated to the second agent) are both $\lambda/2$. Similarly, if the system is in the state 1,0, if one more task arrives, it will be allocated to the agent that is currently idle. Hence, the system cannot transition from state 1,0 to state 2,0 but will always go to state 1,1. The probability in this case of moving to the state 1,1 in which both agents are handling one task each corresponds to the arrival rate $\lambda$. It is also possible that the system reverts back to the state 0,0 where both agents are idle, and the intensity for this corresponds to the intensity $\mu_{21}$, corresponding to the service rate for one agent from group 2 with one customer being served. It is possible to assign different intensities for different agents (from different groups). Even the maximum number of concurrent chat dialogues can vary between different groups of agents.

For a state from which an incoming customer may be routed to more than one agent, the simplest case, as in the example above, is to have equal probabilities for both or all potential agents, but it is also possible to set different probabilities. For example, in state 0,0 or 1,1 it may be set that if agent number 1 is has free capacity then the incoming chat should always be directed to agent number 1, even if agent number 2 also has free capacity. In this case the intensity of moving from state 0,0 to 1,0 would be $\lambda$ and the probability of moving from state 0,0 to 0,1 would be 0. Also, as will be obvious, the probabilities should be set to reflect the actual properties of the system. Different fractions of $\lambda$ may be assigned as long as the sum of all probabilities for a particular situation equals 1.

Figure 3:
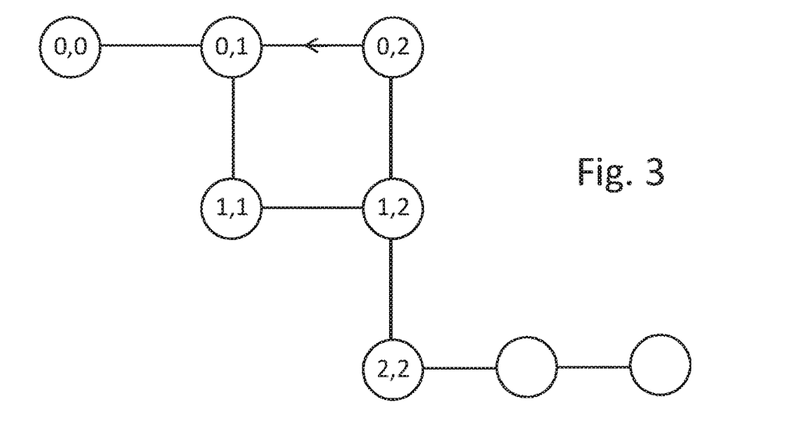
FIG. 3 shows a simplified representation of the queueing system of FIG. 1 where the agents are assumed to be identical.

As the skilled person will realize, if all agents in the system have the same properties, the state space will be symmetric, for example, state 0,1 will have the same properties as state 1,0, etc. This is the case in the system illustrated in FIG. 1. The problem of solving the system can then be simplified to handling the state space shown in FIG. 3. As in FIG. 1, transitions between the states in FIG. 3 are possible in both directions except, as indicated by the single arrows, that if one agent, or group of agents is handling one task and the other one is idle, an incoming task will not be assigned to the agent that is already handling a task. As will be understood, the effect of simplifying the state space in this way will be even greater for larger systems involving more agents. This will be illustrated by way of example in connection with FIG. 9.

A compact way to describe the queueing system is in the form of an intensity matrix and the corresponding state probability vector $\bar{p}$ (row vector). The complete system can then be represented by an intensity matrix Q that is partitioned into four sub-matrices A, B, C and D, according to Eq. 1:

$$Q = \left(\begin{array}{c|c} A & B \\ \hline C & D \end{array}\right) \quad (1)$$

Here, the first sub-matrix A is a sparse band matrix of size N×N ($n'^m \times n'^m$ if all agents are unique), representing the states for which there is no queue. How to construct sub-matrix A will be discussed below. Sub-matrices B and C can be infinite matrices and have only one non-zero element each.

$$B = \begin{pmatrix} 0 & 0 & \ldots \\ \vdots & \ddots & \ldots \\ \lambda & 0 & \ldots \end{pmatrix} \quad (2)$$

$$C = \begin{pmatrix} 0 & \ldots & 0 & \mu_{max} \\ 0 & \ldots & 0 & 0 \\ \vdots & \vdots & \vdots & \vdots \end{pmatrix} \quad (3)$$

The fourth sub-matrix, D, represents the situation when there is a queue. The partial intensity matrix has the tridiagonal form of a traditional M/M/• system and can also be infinite in size. In partial matrices C and D, the elements $\mu_{max} = \Sigma_i \, n_i \, m_i \mu_{in_i}$ for i=1, 2, . . . , g, where g is the number of groups, and $d = (\lambda + \mu_{max})$ $$D = \begin{pmatrix} -d & \lambda & 0 & 0 & \ldots \\ \mu_{max} & -d & \lambda & 0 & \ldots \\ 0 & \mu_{max} & -d & \lambda & \ldots \\ \vdots & \ddots & \ddots & \ddots & \ddots \end{pmatrix} \quad (4)$$

Figure 4:
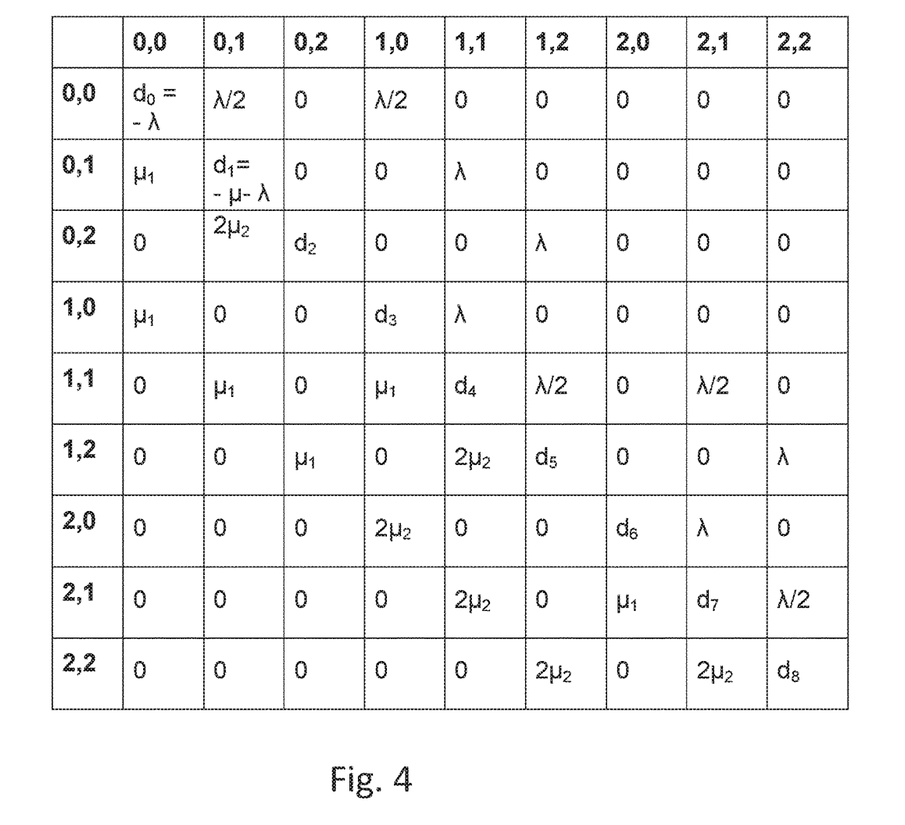
FIG. 4 is an example of a partial intensity matrix representing the situation when there is no queue in the system.

The sub-matrix A is a representation of the intensities indicated in FIG. 2. An example of such a matrix is shown in FIG. 4. The rows and columns of this matrix represent the different states, and each element represents the intensity of transitioning between the two states it relates to, as defined by the combination of row and column, as the skilled person will understand as standard for Markov processes. For each state, the probability of the system transitioning from this state to a state having a higher total number of served customers, is defined in terms of the arrival rate $\lambda$. The probability of the system transitioning from the current state to a state representing fewer served customers, is defined in terms of the service rates $\mu_{ij}$. The diagonal element for each row $d_i$ indicating the intensity of leaving the corresponding state, is then the negative sum of the non-diagonal elements of the same row.

The total matrix resulting from the system described in FIG. 2 would look as follows:

$$\begin{pmatrix} d_1 & \lambda_2 & 0 & \lambda_2 & 0 & 0 & 0 & 0 & 0 & | & 0 & 0 & \ldots \\ \alpha_1 & d_2 & 0 & 0 & \lambda_1 & 0 & 0 & 0 & 0 & | & 0 & 0 & \ldots \\ 0 & \alpha_2 & d_3 & 0 & 0 & \lambda_1 & 0 & 0 & 0 & | & 0 & 0 & \ldots \\ \alpha_1 & 0 & 0 & d_4 & \lambda_1 & 0 & 0 & 0 & 0 & | & 0 & 0 & \ldots \\ 0 & \alpha_1 & 0 & \alpha_1 & d_5 & \lambda_2 & 0 & \lambda_2 & 0 & | & 0 & 0 & \ldots \\ 0 & 0 & \alpha_1 & 0 & \alpha_2 & d_6 & 0 & 0 & \lambda_1 & | & 0 & 0 & \ldots \\ 0 & 0 & 0 & \alpha_2 & 0 & 0 & d_7 & \lambda_1 & 0 & | & 0 & 0 & \ldots \\ 0 & 0 & 0 & 0 & \alpha_2 & 0 & \alpha_1 & d_8 & \lambda_1 & | & 0 & 0 & \ldots \\ 0 & 0 & 0 & 0 & 0 & \alpha_2 & 0 & \alpha_2 & d_9 & | & \lambda_1 & 0 & \ldots \\ \hline 0 & 0 & 0 & 0 & 0 & 0 & 0 & 0 & \alpha_{max} & | & d_{10} & \lambda_1 & \ldots \\ \vdots & \vdots & \vdots & \vdots & \vdots & \vdots & \vdots & \vdots & \vdots & | & \ddots & \ddots & \ddots \end{pmatrix} \quad (5)$$

Where $\Delta_1 = \Delta$, $\Delta_2 = \Delta/2$, $\alpha_1 = \mu_1$, $\alpha_2 = 2\mu_2$ and $\alpha_{max} = \mu_{max}$.

In the following, a general algorithm and an example algorithm for constructing the sub-matrix A will be discussed.

The following definitions are used:

Definition 1: The state of a single agent $a_j$ is given as a non-negative integer k, where the integer represents the number of customers being served at that time for k=0, 1, . . . , n'.

Definition 2: An arbitrary group consists of $m_i$ agents, where each agent can be in states $\{0, 1, \ldots, n'_i\}$, $i \in \{1, 2, \ldots, g\}$. All agents in a group are assumed to be indistinguishable from one another. This feature lowers the number of states that need explicit tracking, since the agents in a group are indistinguishable from each other so that all the different possible permutations can be replaced with one. The preferred option is to choose the one that is organized in increasing fashion from left to right, i.e. {1, 2, 2}, {2, 1, 2} and {2, 2, 1} are all represented as {1, 2, 2}.

The different permutations within a group can still affect assignments of new agents and serviced clients, as the skilled person will realize.

The state space of the queueing system can be viewed in two ways, either by straight forward enumeration of the possible states or by expressing the state in terms of the states all the agents are currently occupying together with the total number of customers in the system. Looking at the sub matrix A the following definitions are applied:

Definition 3: Let $S_e$ be the state enumeration representation, where $S_e \in \{1, \ldots, N\}$.

Definition 4: Let $\bar{a} = a_{(g,m_g)}, \ldots, a_{(g,1)} | \ldots | a_{(1,m_1)}, \ldots, a_{(1,1)}$ be the state representation in terms of the number of customers each agent is serving and ordered in increasing fashion from left to right (within groups) as specified above and where vertical bars indicate separation between groups.

Definitions 3 and 4 above are one-to-one since they are defined for the same state space and therefore it is possible to find a map from one representation to the other, either by a formula or by simply generating all possible states for the a representation and mapping them to $S_e$ by enumeration from 1 to N.

$$\text{Let} \begin{cases} T(\bar{a}) = S_e \\ T^{-1}(S_e) = \bar{a} \end{cases} \text{ for } Se \in \{1, 2, \ldots, N\} \quad (6)$$

The general algorithm for the construction of the A matrix makes heavy use of the mappings in equation (6) as well as definitions No. 5 and 6 below.

Definition 5: For the system in an arbitrary state $\bar{a}$ let $A_+$ represent the set of all states that can be reached by a new arrival from state $\bar{a}$ according to the assignment rule and under the assumption that all permutations of states within groups are represented according to Definition 2 above. Note that the arrival rate to a reachable state may depend on how many permutations that state has for the group. Which waters down to adding one to each reachable agent/group, one at a time, and including the corresponding state vector in the set.

Definition 6: For the system in an arbitrary state $\bar{a}$ let $A_-$ represent the set of all states which can be reached by a finished service under the assumption that all permutations of states within groups are represented according to Definition 2 above. Note that the service rate to a reachable state may depend on how many permutations that state has for the group.

In the following, a general algorithm for creating intensity matrix A will be described, with reference to FIG. 5. The following in-data are needed: assignment rule, arrival rate, service rates, number of agents in each group, max simultaneous tasks for each group, N (the total number of states of matrix A) and the map T from Equation (6).

In a first step S1, a counting variable l is set to 1.
Step S2, row No. l is selected
Arrivals, that is, new chats, are handled in steps S3-S5:

Step S3: From the state representation $\bar{a}$, the state corresponding to row l, and the assignment rule A, find the set $A_+$.

Step S4: Assign each element in $A_+$ the fraction of the arrival intensity the assignment rule dictates depending on the agent configuration of each element, while minding the number of permutations.

Step S5: Use the map $T((\bar{a})_i) = S_e$, for each element $(\bar{a})_i$ in $A_+$ to find the corresponding column and place the fraction of the arrival intensity, as calculated in S4, in this column on row l.

Departures from the system, that is, chats that are closed, are handled in steps S6-S8:

Step S6: From the state representation $\bar{a}$, for the state corresponding to row l, find the set $A_-$.

Step S7: Connect each agent in the set $A_-$, for which the state of the element differs from the given $\bar{a}$ of row l, to the corresponding new total service rate, i.e. the total service rate after the departed customer, while minding the possible modifications due to the permutations.

Step S8: Use the map $T((\bar{a})_i) = S_e$, for each element $(\bar{a})_i$ in $A_-$ to find the corresponding column and place the corresponding new total service rate, from S7, in this column.

How to determine the diagonal element is handled in steps S9-S14:

In step S9, the diagonal element is determined as the negative of the sum of all fractions of arrival rate and service rates from row l.

Step S10 is a decision step, to determine if the current row is row No. N, that is, if the current row is the last one. If current row=N the procedure continues with Step S11, if not, the procedure continues with step S13.

In step S11, the negative of the arrival rate is also added to the diagonal element if M>N (i.e. there is at least one waiting queue state).

In step S12, the diagonal element is entered into the matrix. The diagonal element in this case is the negative of the sum of all fractions of arrival rate and service rates including the negative of the arrival rate if M>N.

In step S13 the diagonal element comprising only the negative of the sum of all fractions of arrival rate and service rates is entered into the matrix.

In step S14 l is set to l+1, and the procedure returns to step S2.

Remark: Finding the sets $A_+$ and $A_-$ can be done by studying the current state $\bar{a}$, corresponding to row l. For arrivals the assignment rule will dictate how new customers should be distributed between agents. For each agent that can be assigned an arrival according to the assignment rule, add one to that agents state, in the state representation form, and add this reachable state $(\bar{a})_i$ as an element to the set, this will create a set $\tilde{A}_+$ which includes all permutations. Remove all permutations for all groups of $\tilde{A}_+$, except the one given by Definition 2 above, to construct $A_+$. One easy way to accomplish this is to view $\bar{a}$ as a N-vector to which one add a N-vector comprising of N−1 zeroes and a one at the position given by the assignment rule. The number of permutations may determine the fractions of arrival intensity. An analogous method may be applied for $A_-$ but considering departures and service intensities instead of arrivals and arrival rate.

Above, a general algorithm has been introduced, under the assumptions that the arrivals follow a Poisson process and the service times are exponentially distributed. The algorithm could be extended to handle hypoexponential service times, like Erlang distributed service times. It should be noted that the order of the rows in the intensity matrix does not matter as long as the state they represent is tracked. For the rest of this discussion it will be assumed that the state when all agents are serving their maximum number of customers is put as the last row of the sub-matrix A.

In the following example, a special situation will be discussed, in which there are as many agents as there are groups, that is, each agent constitutes its own group. Reference is again made to FIG. 5. The same types of input data are needed as for the general algorithm discussed above. As a further simplification, it is assumed that all agents have the same service rates and maximum number of simultaneous tasks. There are g number of groups, where g is a positive integer, $m_i=1$ for all i, $n'_i=n'$ for all i and service intensities $\mu_{i,j}=\mu_j$ for j=0, 1, . . . n' and for each i=1, 2, . . . , g. It is further assumed that new arrivals are assigned to one of the least occupied agents with equal probabilities. The steps are the same as in FIG. 5, but described more specifically for this particular situation.

For this example it is easy to find the mapping T and $T^{-1}$ between $\bar{a}$ and $S_e$, in this case the states of the agents can just be ordered next to each other as $\bar{a}=a_g \ldots a_2 a_1$ then $$T(\bar{a}) = T(a_g|\ldots|a_1) = 1 + \sum_{i=1}^{g} a_i(n'+1)^{i-1} = \quad (7)$$

$$a_g(n'+1)^{g-1} + a_{g-1}(n'+1)^{g-2} + \ldots + a_1(n'+1)^0 + 1 = S_e$$

And the inverse, $T^{-1}$ is easiest to write iteratively:

$$T^{-1}(S_e) = a_g \ldots a_1, \text{ where} \quad (8)$$

$$a_g = \left\lfloor \frac{S_e - 1}{(n'+1)^{g-1}} \right\rfloor$$

$$a_{g-1} = \left\lfloor \frac{S_e - 1 - a_g(n'+1)^{g-1}}{(n'+1)^{g-2}} \right\rfloor \ldots$$

$$\ldots$$

$$a_1 = \left\lfloor \frac{S_e - 1 - \sum_{i=2}^{g} a_i(n'+1)^{i-1}}{(n'+1)^0} \right\rfloor$$

By convention, the floor brackets indicate that the greatest integer that is less than or equal to the number within the brackets should be used.

That implies that $S_e=1$ is equivalent to the state $\bar{a}=0|\ldots|0$, which corresponds to the first row of sub matrix A (could be set to row 0 by removing the +1 in Eq. (7) and −1 in Eq. (8)). The size of the system is given by $N=(n'+1)^g$. Expressions (7) and (8) are used together with the standard assignment rule in the algorithm below.

Steps S1 and S2 are the same as for the general algorithm.

Step S3, that is, finding the set $A_+$, involves identifying the agent or agents currently serving the lowest number of customers. $A_+$ is created by letting each such agent have one additional task one at a time and adding corresponding state to $A_+$, for example $\bar{a}=10201 \Rightarrow A_+=\{11201, 10211\}$, two resulting elements, corresponding to the states reachable from starting state a via an arrival.

In step S4, the arrival rate is assigned to each agent in $A_+$ that was given an additional task in step S3. For the standard assignment rule in this example, that means assigning $$\frac{\lambda}{\text{number of members of } A_+}$$

to each such agent.

Use the map $T((\bar{a})_i)=S_e$, for each $(\bar{a})_i$ in $A_+$ from Eq. (7), to find the corresponding column to place the fraction of the arrival rate in.

In step S6, the set $A_-$ is found by identifying all agents that have at least one customer. $A_-$ is then created by letting each such agent have one job less one at a time than the current situation given by $\bar{a}$ corresponding to row 1 and adding corresponding state to $A_-$, for example $\bar{a}=10201 \Rightarrow A_-=\{00201, 10101, 10200\}$, three resulting elements (states reachable from starting state a via $\bar{a}$ departure).

In step S7, the new total service intensities corresponding to the elements, found in S6, of $A_-$ are calculated and recorded.

In step S8, the map $T((\bar{a})_i)=S_e$, for each $(\bar{a})_i$ in $A_-$, from Eq (7) is used to find the corresponding column to place the new total service rate in, as recorded in S7.

Steps S9-S14 are the same as for the general algorithm

In the following a method of solving the system above will be discussed, starting from the partitioning of the system intensity matrix Q, as shown above in Eq. 1.

The goal is to find a state probability vector $\bar{p}=[x_1 x_2]$ for the given system in steady state, where $x_1$ and $x_2$ are row vectors of size N and M−N respectively. From the general theory of Markov systems it is known that the solution for an irreducible system in steady state, for $\lambda/\mu_{max}<1$, is obtained by making use of the M−1 independent equations from the intensity matrix and using that the sum of the probabilities for all states must be one, $\Sigma_i p_i=1$, for $\bar{p}$ to be a probability distribution and obtain a solution for the state probability vector $\bar{p}$.

It is sufficient to solve a smaller problem in terms of the N−1 independent equations from solving $x_1 \tilde{A}=0$ and using the fact that the rest of the state probabilities depend on $(x_1)_N$ (the N:th element of vector $x_1$).

Based on the matrix Q as defined above, the Schur complement $\tilde{A}=A-BD^{-1}C$ is $$\tilde{A} = A - \begin{pmatrix} 0 & \ldots & 0 \\ \vdots & \ddots & \vdots \\ 0 & \ldots & -\lambda \end{pmatrix} \quad (9)$$

Defining $$A_{II} = \begin{pmatrix} 1 & | & & | \\ \vdots & \tilde{a}_2 & \ldots & \tilde{a}_n \\ \varphi & | & & | \end{pmatrix}, \quad (10)$$

where $$\psi = \sum_{i=0}^{M-N} \left(\frac{\lambda}{\mu_{max}}\right)^i \quad (11)$$

where the columns $\tilde{a}_i$ are the corresponding columns from the matrix $\tilde{A}$ and where the first column of $A_{II}$ consists of ones except for the last element which is defined in (11). If Q is a given intensity matrix for an irreducible Markovian system in steady state, then the problem to be solved is $$x_1 A_{II} = [10 \ldots 0] \quad (12)$$

where the right hand side of (12) is a row-vector of matching size.
Then calculating the state probabilities in $x_2$ as $$(x_2)_i = (x_1)_N \left( \frac{\mu_{max}}{\mu_{max} - \lambda} \right)^i$$

for i=1, 2, . . . , M−N
to include the states representing a waiting queue, that is, the incoming chats that have not yet been assigned to an agent, which means that $$\overline{p}_{j+1} = \begin{cases} \frac{\lambda}{\mu_{max}}(\overline{p})_N = \frac{\lambda}{\mu_{max}}(x_1)_N & \text{for } j = N \\ \frac{\lambda}{\mu_{max}}(\overline{p})_j = \frac{\lambda}{\mu_{max}}(x_2)_{j-N} & \text{for } j = N+1, \ldots, M-N-1 \end{cases} \quad (13)$$

An example of the system sub-matrix A is shown in FIG. 4. As the skilled person will realize, the states are represented along the rows and the columns, as is standard for Markov systems, and the corresponding matrix element for each pair of states indicates the intensity of transitioning between them. As will be understood, the order of the rows and columns corresponding to the different states could be selected in any suitable way. The order of the elements will affect how to solve the matrix, but this modification is within the capabilities of the skilled person, and the outcomes would be equivalent.

Figure 6:
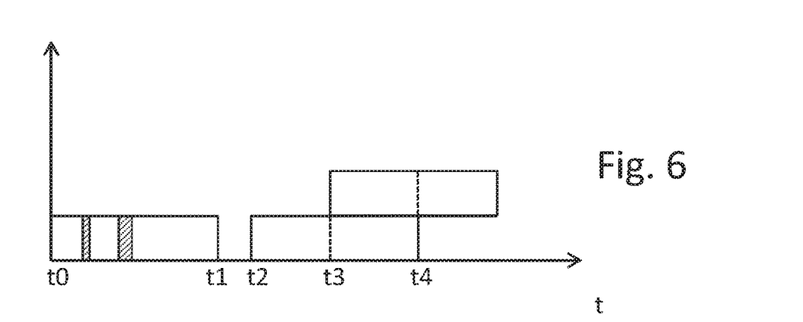
FIG. 6 illustrates, by way of example, the workload of a single agent over time.

FIG. 6 illustrates, by way of example, the workload of a single agent over time. At time t0 the agent is involved in one chat and the service rate will be $\mu_{i1}$ for as long as this chat lasts, until t1. The time periods during which the agent is actively involved in the chat are shown as shaded blocks. During the remaining time, the agent will be waiting for input from the client. At time t2 the agent becomes involved in a second chat and the service rate changes to $\mu_{i1}$ again until time t3, when the agent becomes involved in a third chat while the second chat is still ongoing. At time t3 the service rate therefore becomes $\mu_{i2}$ per customer, which is typically lower than $\mu_{i1}$, but higher than $\mu_{i1}/2$, since some waiting time will arise for both the active chats. At time t4 the second chat is ended, leaving the agent with only the third chat active, and the service rate again becomes $\mu_{i1}$. Exponentially distributed service times have been assumed but the method can easily be extended to handle hypoexponentially distributed times, in particular Erlang distributed service times at the cost of a much larger state space.

The maximum number of concurrent chats per agent should be selected so as to optimize the system in accordance with the service level measure. According to one embodiment of the invention, the maximum number of concurrent chats per agents is determined based on the relationship between the different service rates per customer under different loads. This involves finding the number of simultaneous tasks for which $$(n'+1)\mu_{n'+1} < n'\mu_{n'} > (n'-1)\mu_{n'-1} \quad (14)$$

That is, the optimal number for n', where n' is the maximum number of clients served simultaneously by one agent and $\mu_{in'}$ is the service rate associated with this maximum number.

The maximum number of concurrent chats may also be selected iteratively or determined according to any other suitable method.

Figure 7:
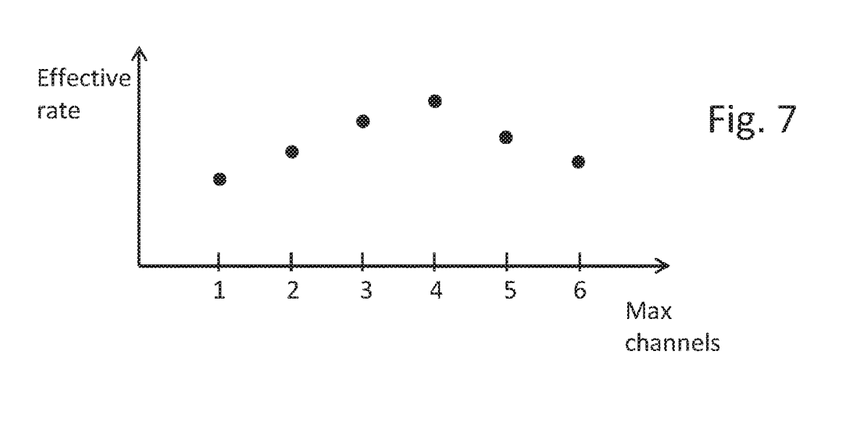
FIG. 7 illustrates, by way of example, the effective service rate as a function of the maximum number of clients served simultaneously by an agent.

FIG. 7 illustrates the effective service rate as a function of the maximum number of clients served simultaneously by an agent. It should be noted that FIG. 7 is only provided as an example and does not necessarily reflect a realistic situation. As can be seen, as the maximum number of channels increases, the effective service rate increases up to a maximum number of four concurrent clients. If the maximum number of simultaneous clients is increased to five, the effective service rate will decrease because of increased response times.

The arrival rate may be estimated in any suitable way. One particularly advantageous method, which will be described in the following, is based on the assumptions that the arrival times are:
  independent from the service rates
  independent of each other
  following a Poisson process This method is based on the fact that estimating the rate parameter of a Poisson process can be done within a maximum likelihood framework, without bias.

The service rates per customer can also be estimated according to any suitable method. A preferred method is based on the estimate of the arrival rate and a maximum likelihood approach.

The overall method of an embodiment of the invention is discussed with reference to FIG. 8.

As indicated by a first method step S100, the method uses the following input data, which may be determined beforehand or in connection with performing the method steps below:
  System model, that is, how to express the state space model that is to be created.
  Service level measure: the parameter or parameters by which the service level should be measured. This may be, for example, a maximum average waiting time before response, or that at least a certain percentage of incoming chats should experience a waiting time less than some given maximum waiting time.
  Target service level: the value for the selected service level measure that the system should fulfill. For example, an average waiting time of maximum 20 seconds, or maximum waiting time for a certain percentage of the incoming chats, for example, that at least 80% of incoming chats should be answered within 50 seconds.
  Agent categories: In the simplest case there is only one agent category, that is, all agents are assumed to have the same properties and are handled as equal. It will also be possible to group agents into categories based, for example, on level of experience. These agent categories could be arranged to handle different maximum numbers of concurrent tasks. For example, the model could specify that trainee agents can handle a maximum of 5 concurrent tasks, regular agents can handle a maximum of 7, whereas experienced agents can handle up to 10 concurrent tasks.
  Estimated arrival rate $\lambda$. As mentioned above, the arrival rate is normally assumed to follow a Poisson distribution with rate parameter $\lambda$.
  Estimated service rates per agent $\mu_{ij}$, where i indicates the agent category and j={0, 1, 2, 3, . . . } the number of customers being served by an agent.
  Rules for how to allocate arriving tasks to agents, an assignment rule. These rules could be based on the division of agents into categories, if applicable. In the simplest case, all agents are supposed to be equal and will be receiving new customers with the same probability when in the same state.

In a first step S101 a tentative maximum number of concurrent tasks per agent is set. Alternatively, this may be part of the input data and not set as part of the method. By including it as the first method step, it will be possible to perform the method for different values for the maximum number of concurrent tasks, to determine the most suitable number.

In step S102 a tentative number of agents is selected. This may be done based on experience, statistics or in any other suitable way.

In step S103 a representation of the system to be solved is created.

Typically, this is achieved by determining a state space depending on the maximum number of concurrent tasks and the number of agents, determined in steps S101 and S102, respectively. Then the intensity matrix is set up, in dependence of the assignment rule, corresponding to the state space and reflecting the probability of the system being in each state under steady state conditions, and dimensioned for the tentative number of concurrent tasks and the tentative number of agents. This corresponds to the system matrix or intensity matrix discussed above comprising the sub-matrices A, B, C and D, or an equivalent matrix having the same elements in a different order. To create this matrix, the state space model indicating all possible states for the system and the transition intensities for all possible transitions between states is defined.

In step S104 this system is solved under the assumption of equilibrium (steady state) to obtain a state probability vector. In step S105 the resulting service level is calculated based on the input data above and the probability vector, using the same service rate measure as for the target service level.

In step S106 the calculated resulting service level is compared to the target service level. Step S107 is a decision step in which it is determined if the procedure should be stopped. There are three possible outcomes: If the resulting service level matches the target service level within a certain tolerance, the procedure may be stopped, and the tentative maximum number of tasks and the tentative number of agents may be used when planning the chat system, as indicated in step S108. If the resulting service level is lower than the target service level, the procedure should be repeated with a higher tentative number of agents. If the resulting service level is higher than the target service level it may be feasible to repeat the procedure with a lower tentative number of agents, to see if the target service level can be reached with fewer agents. A suitable way to end the iterative method, will be if one tentative value has been shown to yield a satisfactory resulting service level and the tentative value decremented by one has resulted in a service level that is somewhat too low. In that case, the higher of the two values will be the lowest possible value that will ensure a sufficient quality of service.

Figures 5, 8:
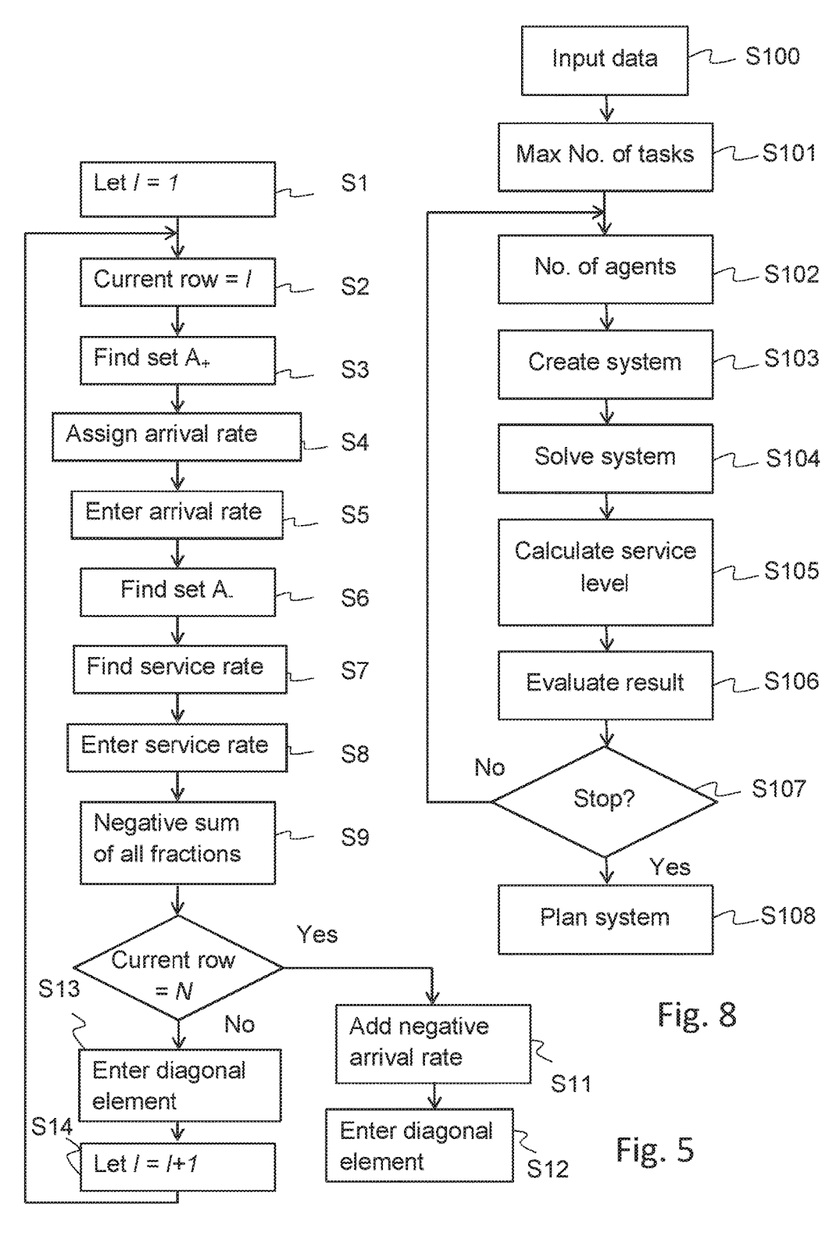
FIG. 5 is a general flow chart for how to generate the partial intensity matrix denoted A.
FIG. 8 is a flow chart of an embodiment of the method according to the invention.

If it is decided that the procedure should be repeated, it may start again from step S102 as indicated in FIG. 8, setting a new number of agents. Alternatively it may start from step S101, meaning that the maximum number of tasks per agent is set again. In this case, of course, the number of agents may or may not be changed in step S102. It would of course also be possible to change any or all of the input data, such as the target service level or the rules for allocation of incoming tasks. Clearly different compositions of groups can be compared to find the optimal composition.

For example, consider table 1 below, where E(x) represents average system time:

TABLE 1

Example of result of solving a system assuming
3 or 4 agents, respectively

| Number of agents | E(x) |
|---|---|
| 3 | 105 |
| 4 | 99 |

If the target service level is set to E(x)<100 then the number of agents must be at least 4 to achieve the required service level. Hence, in the example shown in Table 1, a minimum of four agents are needed.

Figure 9A:
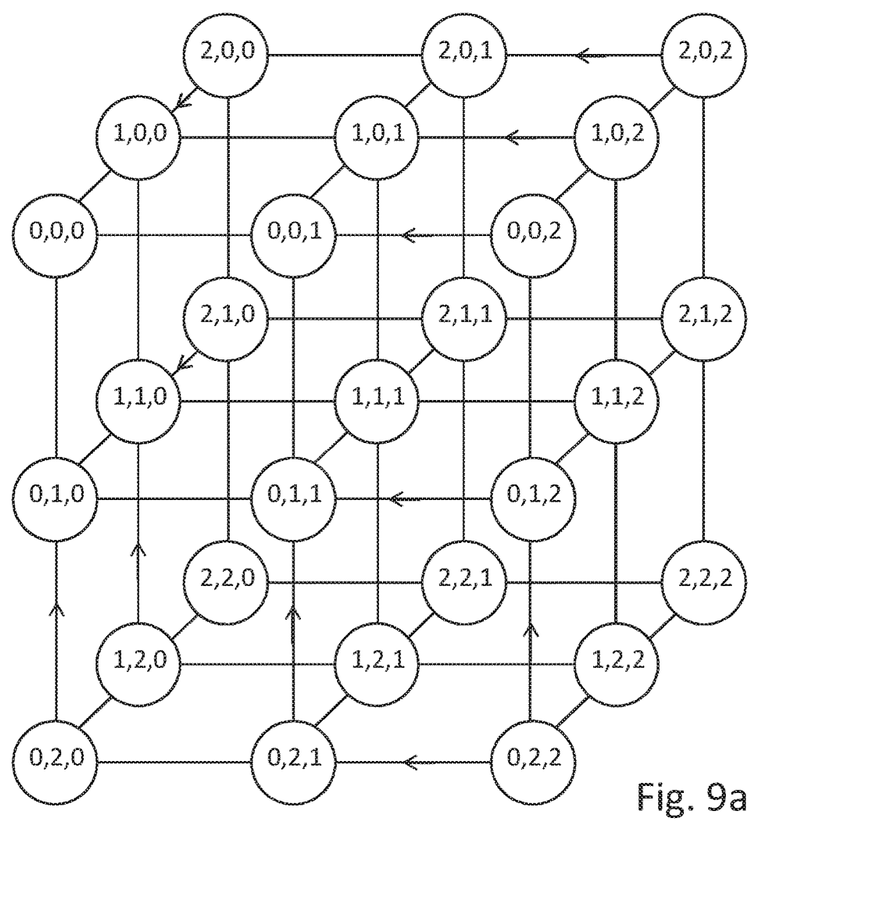
FIGS. 9a, 9b and 9c illustrate a three agent system and possible simplifications of this system when agents are grouped.

FIG. 9a illustrates a state space comprising three agents, each being able to handle up to two concurrent tasks. For each state, the number of tasks handled by agent number 1, agent number 2 and agent number 3 are shown as three digits in that order and separated by commas As in FIGS. 1 and 3, single arrows indicate the transitions that can only take place in the direction of the arrow. All other transitions may take place in both directions, in FIGS. 9a, 9b and 9c.

Figure 9B:
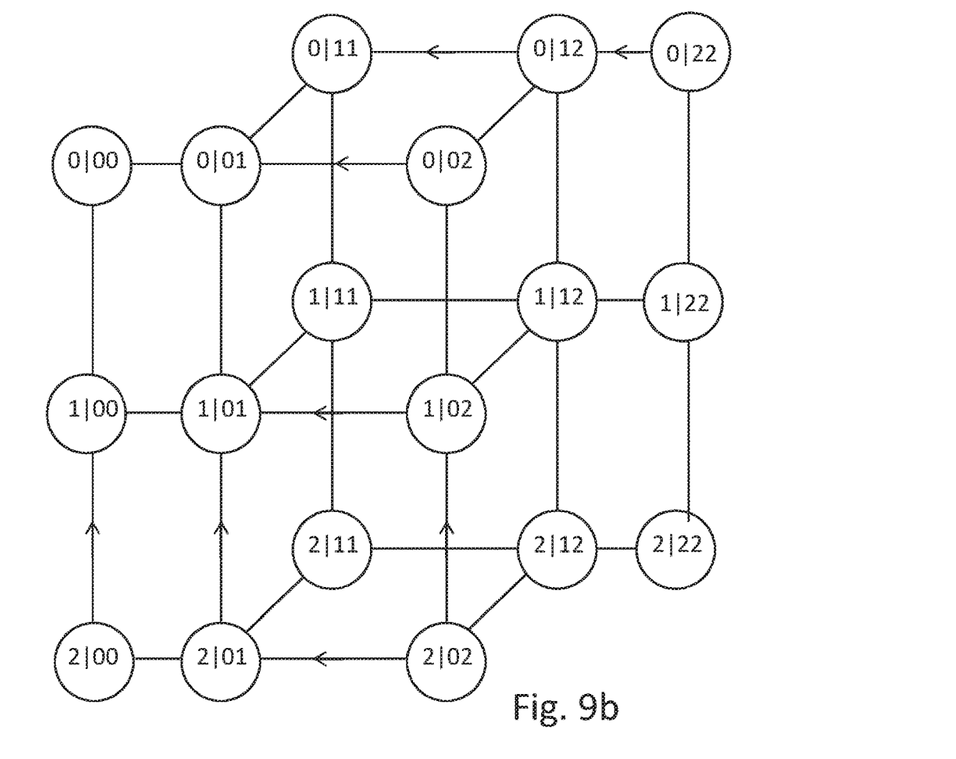
Figure 9C:
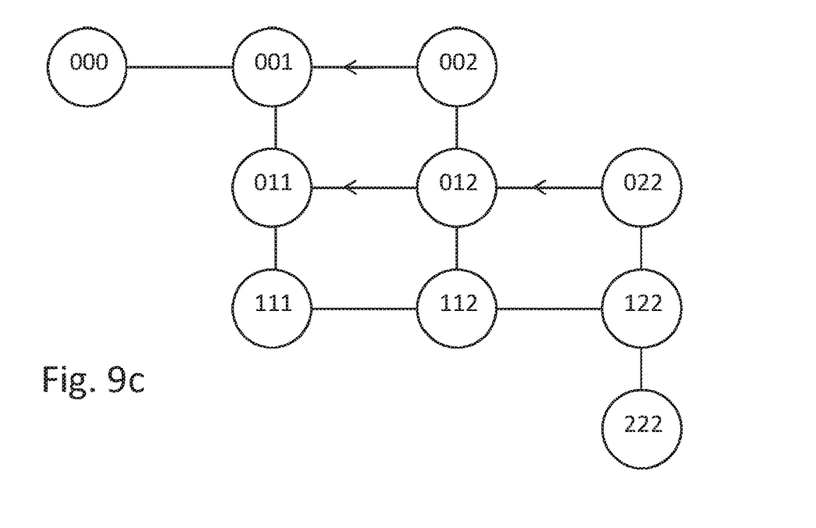

Since all agents in FIG. 9a are represented individually, each possible state must be handled as a unique state. This means that, for example, the three possible states in which one agent handles one task and the other two are idle are handled as three different states indicated as 1,0,0; 0,1,0 and 0,0,1. To handle each possible state in this way, $3^3=27$ different states are needed. In many cases, for all practical purposes some of the states shown in FIG. 9a may be considered as equivalent, so that the state space can be simplified. FIGS. 9b and 9c shows two such examples.

FIG. 9b illustrates a first possible simplification of the system shown in FIG. 9a. In this case, the three agents are grouped into two different categories. The first category comprises agent number 1 and the second category comprises agents number 2 and 3, which are considered to have the same properties. This means, for example, that the situation where agent 2 has one task and agent 3 is idle is identical to the situation where agent 3 has one task and agent 2 is idle. In the notation of FIG. 9b, the categories are separated by a horizontal line. The digit before the horizontal line is the number of tasks handled by agent number 1 and the digits after the horizontal line are the numbers of tasks handled by agents 2 and 3, but not necessarily in that order.

This means, for example, that the state indicated as 2|12 means that agent number 1 is handling two tasks, and either agent 2 is handling one task and agent 3 is handling 2 tasks, or agent 3 is handling one task and agent 2 is handling 2 tasks. In this way a separate state 2|21 is not needed. As shown in FIG. 9b, this simplification allows the number of states to be reduced to 18 instead of 27.

FIG. 9c illustrates a second possible simplification of the system shown in FIG. 9a, in which all three agents are assumed to be identical, or in other words, they all belong to the same group. In the notation of FIG. 9c, each state is defined by three digits indicating the number of tasks handled by agents but in no particular order. For example, the state 012 means that one of the agents is handling one task, one is handling two tasks and one is idle, regardless of which agent is which. In the notation of FIG. 9a, this would cover all of the states 0,1,2; 0,2,1; 1,0,2; 1,2,0; 2,0,1, and 2,1,0. This simplification will reduce the number of unique states to 10 instead of 27.

If agents are grouped together as shown in FIGS. 9b and 9c, rather than assigning an incoming task to an individual agent, a task will be assigned to a category of agents according to the assignment rule and then assigned to one of the agents within that category according to the assignment rule, for example randomly among the agents with the least number of concurrent customers in the category.

Figure 10:
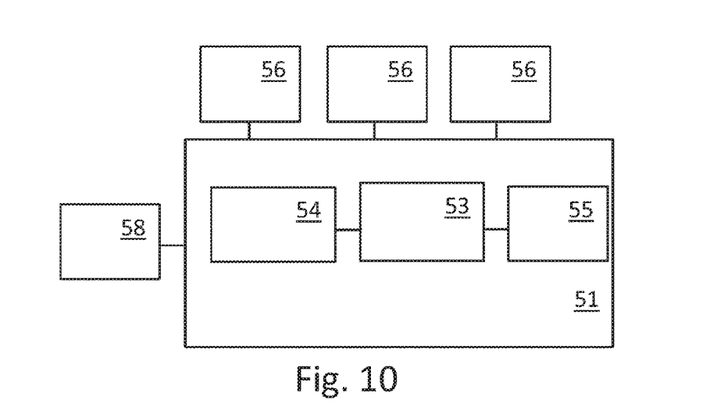
FIG. 10 illustrates schematically a computer system in which the inventive method may be implemented.

FIG. 10 illustrates schematically a computer system in which the method according to the invention may be implemented, using resource planning for a chat based customer support system as an example. The system comprises a computer 51, server or similar unit comprising a processor 53, a program memory unit 54 and a data memory unit 55. The data memory unit 55 holds data such as the input data specified in step S100. The program memory unit holds a program arranged to make the computer execute the method according to the flow chart of FIG. 8. As will be understood, this is only a schematic representation. The skilled person will be aware of different ways of implementing such a computer system. A number of agents are connected to the system, each by means of a terminal 56, personal computer or similar, enabling them to communicate with customers through using a chat function. The chats will typically, but not necessarily, be conducted through the internet. Input means 58 are shown, which may be any type of suitable input means for entering data and/or commands into the system, for example for running the optimization program or selecting a possible number of agents or tasks per agent. Typically the system also comprises output means which may be any type of output means suitable for conveying information and/or prompts to an operator, such as a computer screen a speech generator and/or any other suitable type of output means.

The invention claimed is:

1. A method of estimating a number of active agents needed at a given time, for achieving a target service level for a queueing system involving a number of potential active agents, each active agent being available to work on several tasks in parallel, said method comprising the following steps, performed in a computer:
    obtaining a representation of the queueing system involving a tentative number of active agents and a tentative maximum number of concurrent tasks handled by each agent, said representation comprising
        information on all possible states that the queueing system can be in, each state being defined by the number of tasks handled by each of the active agents, or groups of agents, and number of customers in the queueing system,
        all possible transitions between the possible states,
        the intensity rate for each of the possible transitions,
    calculating the distribution of a state probability vector based on the representation at steady state, service rate values $\mu_{i,j}$ and an arrival rate value $\lambda$
    calculating the resulting service level for the tentative number of active agents based on the state probability vector
    evaluating the result of the calculation, and
    selecting the number of active agents needed in dependence of the resulting service level.

2. The method according to claim 1, wherein the evaluating step includes:
    comparing the resulting service level to the target service level
    selecting the number of active agents needed in dependence of the outcome of the comparison.

3. The method according to claim 1, wherein the service rate values and/or the arrival rate value are based on estimates for the respective values.

4. The method according to claim 1, wherein the arrival intensity for new tasks to the queueing system is assumed to follow a Poisson distribution and/or the service rates are assumed to follow exponential distributions or hypoexponential distributions, in particular Erlang distributions.

5. The method according to claim 1, wherein obtaining the representation of the queueing system involves applying an assignment rule for assigning an incoming task to one of the active agents, wherein the assignment rule may handle the active agents individually or in one or more groups.

6. The method according to claim 5, wherein further comprising setting a maximum number of concurrent tasks for each agent, wherein the maximum number of concurrent tasks may be different or may be the same for all agents.

7. The method according to claim 1, wherein a state is defined by the number of concurrent tasks handled by each of the active agents and the number of customers in the queueing system.

8. The method according to claim 1, wherein a group of agents is defined, each agent in a group arranged to handle the same tentative maximum number of concurrent tasks, the state being based on the number of agents in the groups handling each possible number of concurrent tasks and the number of customers in the queueing system.

9. The method according to claim 1, wherein an incoming task is allocated to one of the active agents by determining which active agent or agents has the lowest number of ongoing tasks and selecting one of these agents.

10. The method according to claim 1, wherein the target service level is selected in dependence of at least one of the following:
    Waiting time (average or maximum or a certain percentage of the tasks)
    Session duration (average or maximum or a certain percentage of the tasks)
    Total time (average or maximum or a certain percentage of the tasks).

11. The method according to claim 1, comprising repeating the method for a second tentative number of active agents and/or a second tentative number of concurrent tasks and/or other group configuration.

12. A non-transitory computer-readable medium encoded with computer executable instructions which, when run in a first computer device will cause the device, in dependence of user input to perform method of estimating a number of active agents needed at a given time, for achieving a target service level for a queueing system involving a number of potential active agents, each active agent being available to work on several tasks in parallel, said method comprising the steps of
    obtaining a representation of the queueing system involving a tentative number of active agents and a tentative maximum number of concurrent tasks handled by each agent, said representation comprising
        information on all possible states that the queueing system can be in, each state being defined by the number of tasks handled by each of the active agents, or groups of agents, and number of customers in the queueing system,
        all possible transitions between the possible states,
        the intensity rate for each of the possible transitions, calculating the distribution of a state probability vector based on the representation at steady state, service rate values $\mu_{i,j}$ and an arrival rate value $\lambda$ calculating the resulting service level for the tentative number of active agents based on the state probability vector evaluating the result of the calculation, and selecting the number of active agents needed in dependence of the resulting service level.

13. The non-transitory computer-readable medium according to claim 12, wherein the evaluating step includes:

comparing the resulting service level to the target service level selecting the number of active agents needed in dependence of the outcome of the comparison.

14. A computer system comprising a processor arranged to run programs, a program memory comprising a program according to claim 12 in such a way that it can be executed in the processor, and a data memory arranged to hold data to be used by the program.

15. The computer system according to claim 14, which is a chat-based communication system.

* * * * *